May 14, 1940. M. PRÜSS ET AL 2,200,581
PURIFICATION OF GASES BY BIOLOGICAL MEANS
Filed Feb. 12, 1938
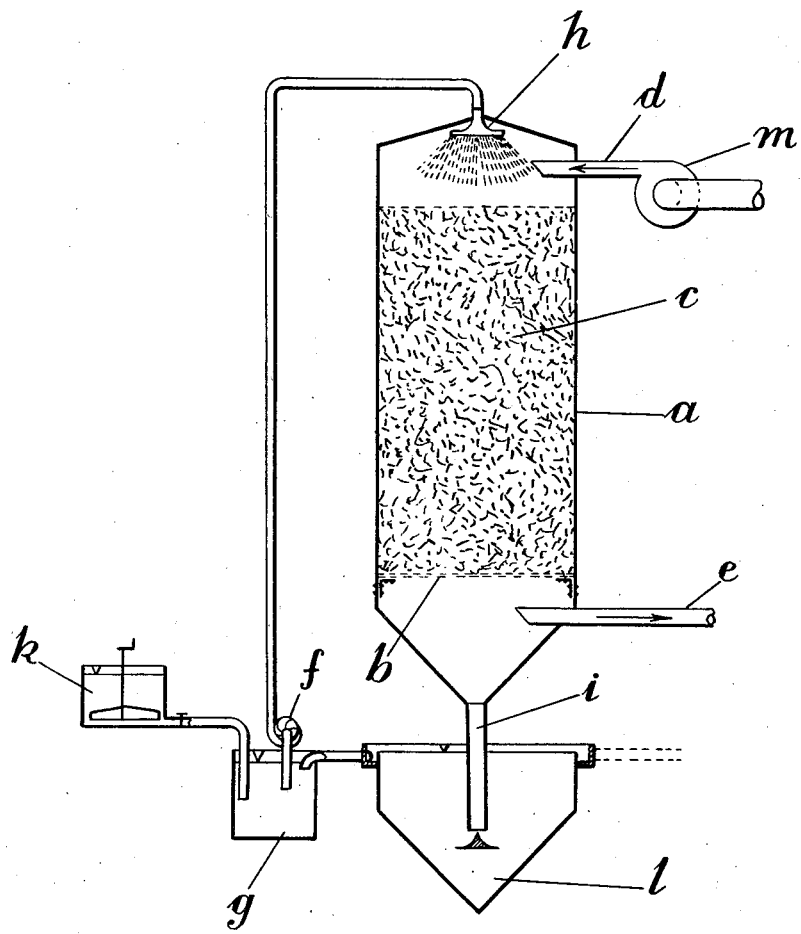

Patented May 14, 1940

2,200,581

UNITED STATES PATENT OFFICE 2,200,581

PURIFICATION OF GASES BY BIOLOGICAL MEANS

Max Prüss and Heinrich Blunk, Essen-Ruhr, Germany

Application February 12, 1938, Serial No. 190,291
In Germany December 24, 1934

4 Claims. (Cl. 195—2)

This invention is concerned with the treating of malodorous air and other gases and the present application is a continuation in part of applicants' co-pending application, Serial No. 54,957, filed December 17, 1935. The process of purifying liquids is claimed in our companion application, Serial No. 190,290, filed February 12, 1938. In many instances the bad odor is due to biologically destructible organic constituents of the air or gas; and the object of the present invention is to remove or render innocuous such constituents.

According to the present invention a gas having a biologically destructible constituent is forced into the upper part of a wholly closed chamber above a biological filter bed consisting of a permeable mechanical support filmed with a culture of micro-organisms, together with a sufficiency of oxygen to aerate the filter bed. Over the upper surface of the filter is distributed a sufficient quantity of a bacteriological nutrient in liquid form to maintain the micro-organic life of the filter bed, and all the gaseous and liquid products admitted to the chamber are forced downwards through the filter bed, whereby the offensive constituents of the gaseous products are rendered innocuous. The liquid and gaseous products are discharged from the bottom of the chamber.

The micro-organisms in question may be specially planted in and on the permeable mechanical support or media, or may be carried thereinto with the gas or an appropriate liquid. They may be nourished by the biologically destructible constituent of the gas or additionally by nutrient substances contained in the water which is necessarily provided for their existence. The permeable mechanical support may be that used in an ordinary biological filter bed the support of which is, for example, made up of broken stone, porcelain rings or the like, down through which the water is caused to trickle.

The micro-organisms may be planted in and on this mechanical support by passing through it for the required period ordinary domestic sewage, for example, the effluent from a sewage works settling tank, which is distributed over the top of the filter and allowed to percolate through the media until the media is thoroughly filmed with a bacteriological mass. It is preferred to use ordinary domestic sewage for the purpose of establishing or planting the micro-organisms because of the variety of micro-organisms which this liquid contains or gives rise to, with the consequence that the filmed media adapts itself to the purification of a variety of gases.

The nourishment of the micro-organisms during the gas purification process may be effected by passing into the filter ordinary domestic sewage, which is particularly suitable because of the mixture of various organic substances which it contains.

Sulphuretted hydrogen may usefully be introduced into the chamber with the other gaseous products, as it is well known to have an inhibitory effect on the growth of molds and algae which might tend to clog the interstices of the filling material; when not present in the gaseous products being treated, sulphuretted hydrogen may be introduced for this purpose.

Examples of gases which may be deodorized by this process are the fumes from fish kitchens or the vapors which may arise from raw sewage wherever exposed; such places may be covered over and the vapor drawn by a blower from this covered space and blown into the top of the enclosed percolating filter. The bad smelling gases, that are separated from sewage when being spread over trickling filters are another example. By covering over such trickling filters and forcing the foul air or gases to be purified under the cover and downward through the biological material in the filter and in the same direction with the sewage. The gases are thus purified biologically in the trickling filter.

Referring to the accompanying drawing, which is a vertical cross section of a suitable percolating filter for carrying out the present invention, $a$ is a closed container having near the bottom a perforated plate, screen or grid $b$ on which the filling material or packing $c$ rests, which may consist of broken stone, porcelain rings or the like. This packing $c$ is a mechanical support upon and in which the micro-organisms are planted. The air or other oxygen-containing gas to be purified, is blown in by a suitable fan $m$ by pipe $d$, and is forced downwards through the filling material in close contact with and in the same direction as the liquid bacteriological nutrient for the filter bed, which is sprayed on to the filling material from the nozzle $h$. The oxygen-containing gas with its malodorous constituent is forced through the filter bed under controlled pressure sufficient to cause it to penetrate the various interstices and so keep the micro-organisms in all parts of the bed in an active state. The air or gas issues from the pipe $e$, purified, having separated from the liquid at the bottom of the filter, where the liquid itself is purified and the air or gas then passes away by the discharge pipe e without being contaminated by coming into contact with incoming impure liquid. The purified liquid passes out through the pipe i into settling tank l, where it deposits the oxidised matter, and dead organisms, which are removed from the bottom of tank l whenever required. The clarified effluent flows off into storage tank g, whence, if the purpose is only purification of gases, it is pumped by the pump f back to the spray h. With it would go what addition in the way of bacterial nutrient may be necessary, this being prepared in tank k and passed into tank g for circulation as required.

In carrying out the process, the offensive gases, the oxygen, and the liquid bacteriological nutrient are all delivered under pressure to the chamber above the filter bed. Thus, as all of the fluids flow down in the same general direction, the gases facilitate and insure the proper downflow of the liquid and insure against clogging or channeling. As the gases are under pressure, a larger portion of them is dissolved in the liquid than would be the case were atmospheric or sub-atmospheric pressure employed and thus, the action or reaction between the gases and micro-organisms is greatly facilitated.

By means of the invention it is feasible to deodorize all evil-smelling air which may be produced in the operation of a sewage plant including a biological filter. All those elements of the plant in which air is apt to be fouled are provided with hoods or other enclosures from which the fouled air can be withdrawn, and with conduits by which the fouled air is conveyed to the blower m and so to the filter bed.

The invention is applicable generally to the treatment of evil odors which result from the manufacture and treatment of organic substances, that is, especially those from fertilizer, poudrette and glue factories and the like, which are specially suitable for such biological destruction. Also, as above mentioned, fumes derived from fish kitchens and hotel kitchens, which heretofore it was hardly possible to deodorize, may be purified in such biological air filters.

Care should be taken that there is always sufficient oxygen present in the air to be purified. If the air to be purified contains too great a proportion of malodorous or poisonous substances for satisfying this requirement then sufficient fresh air or oxygen must be added. By means of such an addition it is also possible, as mentioned above, to deodorize gas mixtures which originally contained no air at all. Similarly the often strongly smelling vapors arising from drying operations, e. g. those from poudrette factories, abattoirs, incinerators and the like may be purified in this way by the addition of air. The supply of the air or other gas to be purified may, in accordance with its concentration, be effected either continuously or alternately with periods of blowing pure air to allow the micro-organisms time to be revivified.

We claim:

1. The process for deodorizing offensive gases which consists in maintaining a biological filter bed in a closed chamber, distributing over the upper surface of said bed a bacteriological nutrient in liquid form to maintain the life of the filter bed, delivering under pressure to said closed chamber above said filter bed the offensive gases to be treated and sufficient oxygen to aerate the filter bed whereby said offensive gases are prevented from escaping to the atmosphere except through said filter bed and whereby the downflow of the liquid through the filter bed is facilitated by and concurrent with the downflow of the gases and oxygen, and separating the deodorized gases from the liquid below the bed.

2. The process as defined in claim 1 wherein the liquid separated from the gas below the filter bed is re-delivered to the upper surface of the bed.

3. The process as defined in claim 1 wherein the liquid separated from the gas is enriched with further bacteriological nutrient and then delivered to the upper surface of the bed.

4. The process as defined in claim 1 wherein hydrogen sulphide is delivered to the chamber above the filter bed and passed down through the filter bed with the gaseous products and liquid whereby the growth of fungi, algae, and the like in the filter bed is inhibited.

MAX PRÜSS.
HEINRICH BLUNK.